Figure 1:
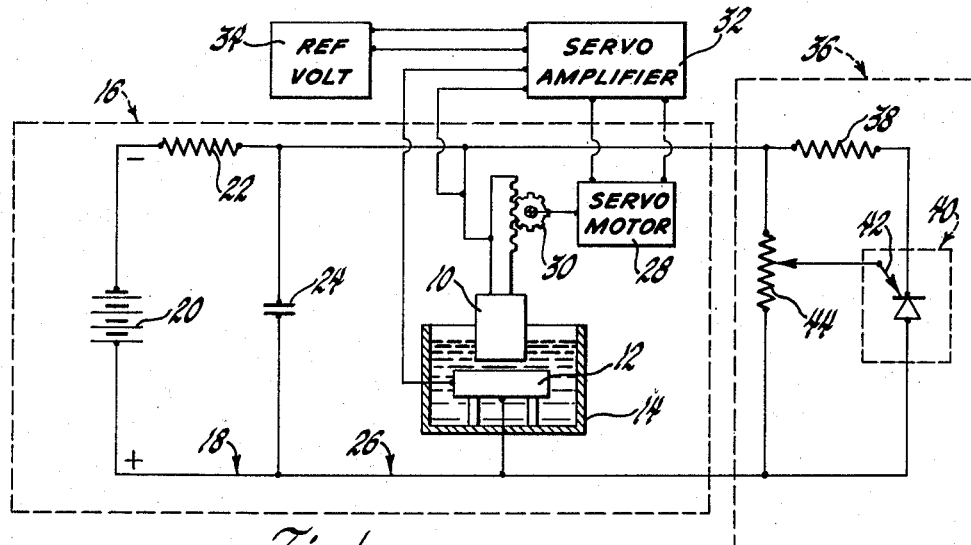

Oct. 29, 1963

A. F. SCARPELLI 3,109,120

ELECTRICAL STOCK REMOVAL APPARATUS

Filed Oct. 20, 1960

INVENTOR.
August F. Scarpelli
BY
Hugh L. Fisher
ATTORNEY

United States Patent Office 3,109,120
Patented Oct. 29, 1963

3,109,120
ELECTRICAL STOCK REMOVAL APPARATUS
August F. Scarpelli, Warren, Mich., assignor to General Motors Corporation, Detroit, Mich., a corporation of Delaware
Filed Oct. 20, 1960, Ser. No. 63,766
16 Claims. (Cl. 314—68)

This invention relates to electrical stock removal apparatus and particularly to improvements in the power supply therefor.

In any stock removal process, accuracy and finish of the completed part are of primary importance since each is determinative of how, and to what application can be made of the process. This is also true in any process employing electricity, such as that commonly referred to as electric discharge machining, a process in which time spaced electrical discharges are generated across a gap formed between conductive tool and workpiece electrodes and cause stock to be eroded from the workpiece electrode. In this process, the frequency of the discharges and the gap voltage, both of which are determined primarily by the power supply, influence to a substantial degree the accuracy and the finish of the completed part and additionally determine the stock removal rate. Consequently, and dependent on the requirements of the completed workpiece, gap voltage must not be too high if accuracy and finish are demanded since in general, with increased gap voltage, there is a greater tendency to overcut as well as produce a poor finish. On the other hand, if the gap voltage is too low, although overcut may be less and finish improved, the stock removal rate is reduced; this, of course, is always undesirable since workpiece fabrication costs are directly related to stock removal rates.

For these reasons, it has been necessary to accept a compromise by reducing the supply voltage, particularly when accuracy and finish are required, in order to be sure that the gap voltage is always maintained within safe limits. Otherwise, if gap voltage exceeded, for an instant a safe limit, irreparable damage to a workpiece could result.

With the foregoing in mind, the invention contemplates for use with electrical stock removal apparatus a novel power supply wherein gap voltage is limited to a predetermined safe level, thus permitting a higher supply voltage to be utilized without any concern for the possibility that gap voltage may exceed safe limits for the particular application of the process. With this arrangement, the stock removal rate can accordingly be increased without sacrifice of finish and accuracy in the completed part.

More specifically, the invention affords a power supply in which the impedance of the gap circuit can be changed when required so as to limit the gap voltage to a desired value.

By the invention, and as another objective thereof, provision is made for increasing the current flow through an impedance in the gap circuit whenever gap voltage attains a predetermined value thereby increasing the voltage drop across the impedance and accordingly limiting the gap voltage. Checks of the gap spacing can be made by the invention at a plurality of points between the workpiece and the tool thereby insuring that a representative determination of gap spacing is made. Moreover, a convenient adjustment is afforded that permits the selected gap voltage value to be altered in accordance with the requirements of the particular job.

Figure 2:
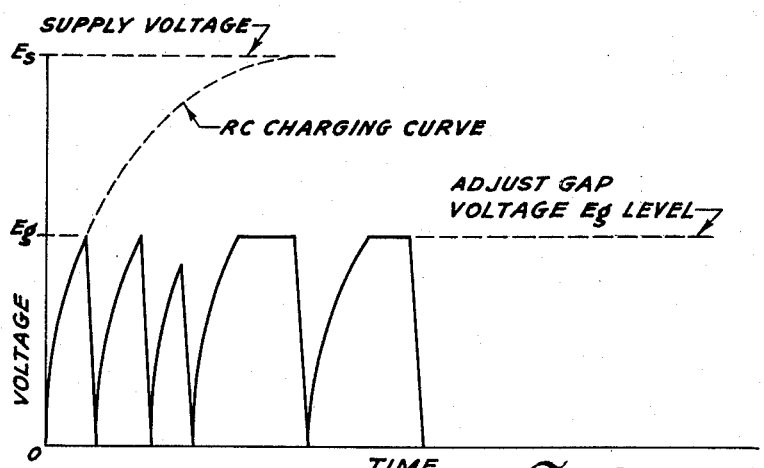

The foregoing and other objects and advantages of the invention will become apparent from the following description and from the accompanying drawings in which:

FIGURE 1 is a diagrammatic view of electrical stock removal apparatus incorporating the principles of the invention; and FIGURE 2 is a curve demonstrating the relationship between gap voltage and supply voltage.

Considering the drawings in detail, and referring particularly to FIGURE 1, the numerals 10 and 12 denote the electrodes employed by the apparatus. Electrode 10 represents the tool and electrode 12, the workpiece, as they will be hereinafter designated. The workpiece 12, which is machined to conform to the contour of the tool 10, is positioned within a container 14 that is filled with a suitable dielectric fluid. The tool 10, the cathode, and the workpiece 12, the anode, are stationed apart so as to form a certain gap therebetween to which power is supplied by a gap circuit 16. The gap circuit 16 furnishes time spaced pulses to the gap, and these, in turn, produce ionization of the dielectric fluid such that electrical discharges occur across the gap. Each discharge erodes a particle of stock from the workpiece 12 so as to reproduce the contour of the tool 10. This EDM process is well known and further explanation is not believed necessary.

The gap circuit 16 has as a part thereof a charging circuit 18 incorporating an appropriate D.C. source of supply voltage 20 and a primary impedance, as current limiting resistor 22, both of which are in series with an energy storage means such as the capacitor 24. The gap circuit 16 also has a discharging circuit 26 and this circuit includes both the capacitor 24 and the gap formed between the tool 10 and the workpiece 12.

With the circuitry so far described, the D.C. source 20 charges the capacitor 24 through the resistor 22 and when this voltage is adequate to ionize the gap, the capacitor 24 will discharge, producing the aforementioned stock eroding electrical discharges across the gap. The repetition rate of these discharges is governed primarily by the supply voltage from the D.C. source 20, the RC time constant, and the gap spacing.

The gap spacing is controlled in accordance with the gap voltage, which will be proportional to the spacing, through the agency of a servomotor 28. Servomotor 28 may directly maneuver either the electrode 10 or the workpiece 12, or both, in any known way, e.g., through a piston type arrangement, as disclosed in the Patent 3,059,150 to Colten et al., or by suitable gearing 30. This structure, of course, will be determined by the application of the apparatus. The servomotor 28 is controlled by a servo amplifier 32, which has gap voltage supplied to the input thereof along with a reference voltage from a source 34. The two voltages are summed in an appropriate way, e.g., as explained in the aforementioned Colten et al. application, and any difference will produce an error signal that is amplified if required and furnished to the servomotor 28.

To further explain the comparison of the voltages and without limitation, it may be assumed that a reference voltage of 60 volts corresponds to the exact gap spacing desired. Since the gap voltage will have a negative polarity, the reference voltage will be made positive so that at the proper spacing a negative 60 volts will be compared with the positive 60 volts and a null error signal will be developed. But, if the gap spacing is less than desired, such that the gap voltage is a negative 10 volts, then upon comparison with the reference voltage an error signal of +50 volts will be developed and will cause the servomotor 28 to withdraw the tool 10 until the null error signal is again developed. In the same way, if the spacing is too great, a negative error signal will result, causing the tool 10 to be fed toward the workpiece 12.

With the power supply described, care must be taken in selecting the proper voltage source since if this is too high, the tendency will be to overcut or machine the workpiece 12 oversize and also, a poor finish will be produced. If this is objectionable, a compromise must be made and a lower supply voltage utilized, which as mentioned before, will cause the frequency or repetition rate of the discharges across the gap to be slower. Also, for various reasons, it may be necessary to protect the workpiece 12 against the possibility that gap voltage can conceivably become too high with the particular supply voltage being utilized and damage the workpiece 12.

It is for the just mentioned reasons that a passive circuit, such as the gap control circuit, shown generally at 36, is employed for limiting gap voltage to some selected safe level, regardless of the supply voltage. This circuit 36 includes a secondary impedance, in this embodiment a resistor 38, and a suitable unidirectional conducting device, the conductivity of which is controlled. This device may be in the form of a grid controlled triode or as depicted, a silicon controlled rectifier 40 poled as demonstrated and including a gate 42 that is connected to a potentiometer 44. The potentiometer 44 may be adjusted so as to trigger the control rectifier 40 at the maximum desired gap voltage level; whereas prior to this triggering, the control rectifier 40 will be non-conductive for all practical purposes.

To explain the operation of the gap control circuit 36, it will again be assumed that the desired gap voltage is to be 60 volts and further that the supply voltage is 100 volts. Therefore, it will be necessary to reduce the supply voltage 40 volts to the desired 60-volt level. This can be done by proper correlation of the resistors 22 and 38 according to the following equation:

$$E_g = \frac{R_{38}}{R_{22}+R_{38}} E_s$$

where $E_s$ and $E_g$ represent the source and gap voltages, respectively, and $R_{22}$ and $R_{38}$ the resistance of resistors 22 and 38.

With the proper resistances, if gap voltage exceeds the 60 volts, the proportion thereof determined by the potentiometer 44 will be such that the control rectifier 40 will become conductive. In other words, the control voltage established by the potentiometer 44 will have some fixed relationship to the gap voltage so as to always correspond to or reflect gap voltage. When this happens, more current will flow through resistor 22 increasing the voltage drop thereacross so that the voltage across the gap is maintained at the 60 volt level, any excess being dropped across the resistor 22 due to the increased current flow. This relationship is shown in the curves of FIGURE 2, for with the higher supply voltage and the control circuit 36, gap voltage is maintained at the $E_g$ level indicated. The capacitor 24 will discharge at this voltage $E_g$ and cause the stock removing discharge across the gap, after which the gap voltage will decrease to substantially zero.

Preferably, the gap spacing established by the reference voltage is made such that the capacitor 24 discharges slightly below the 60-volt level so that the control rectifier 40 will normally be non-conductive but still offer the safeguard against gap voltage rising from time to time to an unsafe level. In this way, assurance can be had that no damage will be produced to the finish nor will the workpiece 12 be machined oversize.

With the control circuit 36, as can be seen, a higher voltage source can be utilized while gap voltage is still always maintained within safe limits. This is accomplished without the need for an external voltage source, which necessarily would have to be accurately controlled by a proper regulator. In fact, the supply voltage can, by way of example and without limitation, be within the range of 100 to 300 volts while the gap voltage is being maintained between 25 to 60 volts. This permits the stock removal rate to be increased without concern about excessive gap voltages while still maintaining the proper finish on the workpiece 12. The increased stock removal rate is realized because the higher supply voltage does produce a faster charging rate as can be demonstrated by the equation:

$$\text{Capacitor charging time} = RC \ln \frac{E_s}{E_s - E_g}$$

where RC is the time constant determined by the resistor 22 and the capacitor 24 and $E_s$ and $E_g$ again correspond, respectively, to the source and gap voltages. From this equation, it can be seen that increasing the supply voltage $E_s$ does increase the frequency of the discharges.

Another aspect of the control of gap voltage relates to overcut or accuracy of the finished workpiece 12, for a lower gap voltage results in less overcut and thereby produces a more accurate workpiece. This is achieved while using a higher supply voltage, so essential for the desirable increased stock removal rates. The convenient adjustment of the gap voltage afforded by the potentiometer 44 still enables the operator to predetermine and select both the overcut and the accuracy best suited for the particular job.

The invention is to be limited only by the following claims.

I claim:

1. In electrical stock removal apparatus, the combination of conductive tool and workpiece electrodes spaced apart so as to form a gap therebetween filled with a dielectric medium, a voltage source for producing at a gap voltage of a predetermined value time spaced discharges across the gap so as to remove stock from the workpiece electrode, and passive circuit means for limiting the gap voltage to the predetermined value.

2. In electrical stock removal apparatus, the combination of conductive tool and workpiece electrodes spaced apart so as to form a gap therebetween filled with a dielectric medium, a voltage source for producing at a gap voltage of a predetermined value time spaced discharges across the gap so as to remove stock from the workpiece electrode, and passive circuit means in parallel with the gap for limiting the gap voltage to the predetermined value.

3. In electrical stock removal apparatus, the combination of conductive tool and workpiece electrodes spaced apart so as to form a gap therebetween filled with a dielectric medium, a power source, a gap circuit connecting the power source across the gap and so arranged as to produce at a gap voltage of a predetermined value time spaced discharges across the gap for removing stock from the workpiece electrode, and means in the gap circuit changing the impedance of the gap circuit so as to limit the gap voltage to the predetermined value.

4. In electrical stock removal apparatus, the combination of conductive tool and workpiece electrodes spaced apart so as to form a gap therebetween filled with a dielectric medium, a gap circuit including an impedance and a power source, the gap circuit being so arranged as to produce at a gap voltage of a predetermined value time spaced discharges across the gap for removing stock from the workpiece electrode, and passive circuit means changing the voltage drop of the gap circuit so as to limit the gap voltage to the predetermined value.

5. In electrical stock removal apparatus, the combination of conductive tool and workpiece electrodes spaced apart so as to form a gap therebetween filled with a dielectric medium, a source of current, a gap circuit including an impedance and a source of current, the gap circuit being arranged to produce at a gap voltage of a predetermined value time spaced discharges across the gap for removing stock from the workpiece electrode, and passive circuit means providing a shunt path for current around the gap so as to increase the voltage drop across the impedance and thereby limit the gap voltage to the predetermined value.

6. In electrical stock removal apparatus, the combination of conductive tool and workpiece electrodes spaced apart so as to form a gap therebetween filled with a dielectric medium, a gap circuit including an impedance and a source of current, the gap circuit being arranged to produce at a gap voltage of a predetermined value time spaced discharges across the gap for removing stock from the workpiece electrode, and passive circuit means providing a shunt path for current around the gap so as to increase the voltage drop across the impedance and thereby limit the gap voltage to the predetermined value, the passive circuit means including means rendering the shunt path effective in response to a control voltage corresponding to gap voltage.

7. In electrical stock removal apparatus; the combination of conductive tool and workpiece electrodes spaced apart so as to form a gap therebetween filled with a dielectric medium; a source of current; a gap circuit including a primary impedance in series with the gap and the source of current; the gap circuit being so arranged as to produce at a gap voltage of a predetermined value time spaced discharges across the gap for removing stock from the workpiece electrode; and a control circuit including a secondary impedance in parallel with the gap and a device for initiating current flow within the control circuit in response to a control voltage corresponding to gap voltage so as to increase the voltage drop across the primary impedance and thereby limit the gap voltage to the predetermined value.

8. In electrical stock removal apparatus; the combination of conductive tool and workpiece electrodes spaced apart so as to form a gap therebetween filled with a dielectric medium; a gap circuit including a primary impedance and a source of voltage; the gap circuit being so arranged as to produce time spaced discharges across the gap for removing stock from the workpiece electrode; and a control circuit including a secondary impedance in parallel with the gap, a unidirectional conducting device, and means rendering the unidirectional conducting device conductive in response to a control voltage corresponding to gap voltage so as to increase the voltage drop across the primary impedance and thereby limit gap voltage to a predetermined value.

9. In electrical stock removal apparatus; the combination of conductive tool and workpiece electrodes spaced apart so as to form a gap therebetween filled with a dielectric medium; a source of current; a gap circuit including a primary impedance in series with the gap and the source of current; the gap circuit being so arranged as to produce time spaced discharges across the gap for removing stock from the workpiece electrode; and a control circuit including a secondary impedance in parallel with the gap, a unidirectional conducting device, and variable impedance means for rendering the unidirectional conducting device conductive in response to a control voltage corresponding to gap voltage so as to increase the voltage drop across the primary impedance and thereby limit gap voltage to a predetermined value.

10. In electrical stock removal apparatus; the combination of conductive tool and workpiece electrodes spaced apart so as to form a gap therebetween filled with a dielectric medium; a source of current; a gap circuit including a primary impedance in series with the gap and the source of current; the gap circuit being so arranged as to produce time spaced discharges across the gap for removing stock from the workpiece electrode, and a control circuit including a secondary impedance in parallel with the gap, a controlled rectifier, and a potentiometer controlling the rectifier; the potentiometer being so arranged as to apply a control voltage corresponding to the gap voltage to the rectifier; the rectifier becoming conductive when the control voltage attains a certain value thereby increasing the voltage drop across the primary impedance so as to limit the gap voltage to a predetermined value.

11. In electrical stock removal apparatus; the combination of conductive tool and workpiece electrodes spaced apart so as to form a gap therebetween filled with a dielectric fluid; electrical storage means; a charging circuit including a source of energy for charging the storage means; a discharging circuit including the storage means and the gap and rendered effective to discharge the storage means upon rupture of the dielectric medium at a gap voltage of a predetermined value; and passive circuit means for limiting the gap voltage to the predetermined value.

12. In electrical stock removal apparatus; the combination of conductive tool and workpiece electrodes spaced apart so as to form a gap therebetween filled with a dielectric medium; capacitative storage means for storing a predetermined quantity of electrical energy; a charging circuit including a primary impedance in series with the storage means and a source of energy for charging the storage means; a discharging circuit including the storage means and the gap and rendered effective to discharge the storage means upon rupture of the dielectric medium at a gap voltage of a predetermined value so as to cause stock to be removed from the workpiece electrode; and a control circuit including a secondary impedance in parallel with the gap and a device for initiating current flow within the control circuit in response to a control voltage corresponding to gap voltage so as to increase the voltage drop across the primary impedance and thereby limit the gap voltage to the predetermined value.

13. In electrical stock removal apparatus; the combination of conductive tool and workpiece electrodes spaced apart so as to form a gap therebetween filled with a dielectric medium; capacitative storage means for storing a predetermined quantity of electrical energy; a charging circuit including a primary impedance in series with the storage means and a source of energy for charging the storage means; a discharging circuit including the storage means and the gap and rendered effective to discharge the storage means upon rupture of the dielectric medium so as to cause stock to be removed from the workpiece electrode; and a control circuit including a secondary impedance in parallel with the gap, a unidirectional conductive device, and means rendering the unidirectional conductive device conductive in response to a certain voltage corresponding to gap voltage so as to increase the voltage drop across the primary impedance and thereby limit the gap voltage to a predetermined value.

14. In electrical stock removal apparatus; the combination of conductive tool and workpiece electrodes spaced apart so as to form a gap therebetween; a capacitor for storing a predetermined quantity of electrical energy; a dielectric medium within the gap; a charging circuit including a primary resistor in series with the capacitor and a source of energy for charging the capacitor; a discharging circuit including a capacitor and the gap and rendered effective to discharge the capacitor upon rupture of the dielectric medium so as to produce electrical stock removing discharges across the gap; and a control circuit including a secondary resistor in parallel with the gap, a controlled rectifier, and a potentiometer controlling the rectifier, the potentiometer being so arranged as to apply a control voltage corresponding to gap voltage to the rectifier, the rectifier becoming conductive when the control voltage attains a certain value thereby increasing the voltage drop across the primary resistor so as to limit the gap voltage to a predetermined value.

15. In electrical stock removal apparatus, the combination of conductive tool and workpiece electrodes spaced apart so as to form a gap therebetween filled with a dielectric medium, a source of current, a gap circuit including a primary impedance in series with the gap and the source of current, the gap circuit being so arranged as to produce time spaced discharges across the gap at a gap voltage of a predetermined value for removing stock from the workpiece electrode, passive circuit means for limiting the gap voltage to the predetermined value, and means maintaining a predetermined gap spacing in response to the gap voltage so that the passive circuit means is normally inoperative.

16. In electrical stock removal apparatus, the combination of conductive tool and workpiece electrodes spaced apart so as to form a gap therebetween filled with a dielectric medium, a source of current, a gap circuit including an impedance in series with the gap and the source of current, the gap circuit being arranged to produce time spaced discharges across the gap at a gap voltage of a predetermined value for removing stock from the workpiece electrode, passive circuit means providing a shunt path for current around the gap so as to increase the voltage drop across the impedance and thereby limit the gap voltage to the predetermined value, and means maintaining a predetermined gap spacing in response to the gap voltage so that the means providing a shunt path for current is normally inoperative.

References Cited in the file of this patent

UNITED STATES PATENTS

| | | |
|---|---|---|
| 2,773,168 | Williams | Dec. 4, 1956 |
| 2,895,080 | Branker | July 14, 1959 |
| 2,951,142 | Ullmann | Aug. 30, 1960 |